United States Patent [19]
Tsunefuji et al.

[11] Patent Number: 5,298,929
[45] Date of Patent: Mar. 29, 1994

[54] CAMERA

[75] Inventors: Katsuhiko Tsunefuji, Sagamihara; Masaki Tokui, Kanagawa; Sumio Kawai, Hachioji; Akira Watanabe, Fuchu; Koji Suzuki, Shiki, all of Japan

[73] Assignee: Olympus Optical Co., Ltd., Tokyo, Japan

[21] Appl. No.: 926,500

[22] Filed: Aug. 5, 1992

[30] Foreign Application Priority Data

Aug. 9, 1991 [JP] Japan .................................. 3-200877
Nov. 25, 1991 [JP] Japan .................................. 3-309334

[51] Int. Cl.⁵ .............................................. G03B 17/02
[52] U.S. Cl. .................................................... 354/159
[58] Field of Search ............... 354/159, 203, 212, 214, 354/217

[56] References Cited

U.S. PATENT DOCUMENTS

| | | | |
|---|---|---|---|
| 4,477,162 | 10/1984 | Matsumoto | 354/173.11 |
| 4,482,229 | 11/1984 | Sugiura | 354/212 |
| 4,579,432 | 4/1986 | Kobayashi | 354/21 |
| 4,687,311 | 8/1987 | Malloy Desormeaux | 354/217 |
| 4,737,809 | 4/1988 | Konno | 354/212 |
| 4,779,109 | 10/1988 | Kawamura et al. | 354/21 |
| 4,965,616 | 10/1990 | Horiuchi | 354/212 |
| 5,182,590 | 1/1993 | Kaihara et al. | 354/106 |

FOREIGN PATENT DOCUMENTS

| | | |
|---|---|---|
| 36-14234 | 8/1961 | Japan . |
| 48-35775 | 10/1973 | Japan . |
| 57-202524 | 11/1982 | Japan . |
| 58-142324 | 8/1983 | Japan . |
| 3-77930 | 4/1991 | Japan . |

Primary Examiner—Michael L. Gellner
Assistant Examiner—Nicholas J. Tuccillo
Attorney, Agent, or Firm—Louis Weinstein

[57] ABSTRACT

The present invention provides a camera for selectively supporting a film having perforations along its upper and lower edges and a film not having the perforations, comprising masking plates for photographic screen size setting that are installed in a camera body to be freely movable to positions at least between the inside and outside of perforations, a perforation detector for determining whether perforations are present on the edges of at least the photographic screens of a film loaded in a camera body, and a masking plate drive for receiving an output of the perforation detector, moving the masking plates to a screen size setting inside of perforations when a film is perforated, and moving the masking plates to a screen size setting including a portion corresponding to the perforations when a film is imperforated.

26 Claims, 10 Drawing Sheets

CAMERA

BACKGROUND OF THE INVENTION

1. Field of the Invention

The present invention relates to a camera for supporting a roll film having perforations along its upper and lower edges and a roll film not having the perforations. More particularly, this invention is concerned with a camera for employing a film cartridge of a size 135 specified in the Japanese Industrial Standard (JIS) and switching photographic screen sizes depending on the presence or absence of perforations on a roll film.

2. Description of the Related Art

A camera capable of switching photographic screen sizes for a roll film has been disclosed in Japanese Patent Laid-Open No. 36-14234 in the past. This camera changes photographic screen masking plates and finder window sizes simultaneously. Using the same camera, photographic screen sizes are changed externally according to the purposes of photography, then photographs are taken. The spacing of photographic screens is held constant, and a photographic screen size is displayed on the finder window.

Japanese Patent Laid-Open No. 58-142324 has disclosed a large-sized camera that is designed for a Brownie film and still supports a JIS 135-size film. In the camera, a film advancing drive is incorporated. The film advancing drive is operated using an advancing lever formed on a camera body, so that a Brownie film take-up and a film take-up for a JIS 135-size film cartridge can be switched freely. In each of the Brownie film take-up and JIS 135-size film cartridge take-up, a film advancing mechanism interlocked with the film advancing drive is incorporated.

Japanese Utility Model Publication No. 48-35775, which has no relation to a camera capable of switching photographic screen sizes, has described that films are exposed in different screen sizes using cartridges of the same kind, then the screen sizes adopted for the films in the cartridges are identified by looking at the appearances of the cartridges.

In conventional cameras capable of switching photographic screen sizes, photographic screen sizes are switched manually and the switching mechanisms are complex. The Japanese Patent Laid-Open No. 36-14234 has disclosed a photographic screen switching means. Herein, when a JIS 135-size film cartridge is employed, photographic screens are changed from a standard size of 24 mm by 36 mm to a half size of 24 mm by 18 mm; that is, only the length in the film feeding direction can be changed. At this time, the film length in the direction orthogonal to the feeding direction cannot be changed. Therefore, photographic screens can be shrunk to the half size and exposed easily. It is, however, hard to provide photographic screens larger than the standard size, because a film can be enlarged only in the feeding direction.

The art disclosed in the Japanese Patent Laid-Open No. 58-142324 is restricted to large-sized cameras using a Brownie film or other large-sized film but cannot apply to cameras capable of loading only a JIS 135-size film cartridge. To change the sizes of photographic screens, a film of a different size must be loaded. When only, for example, a JIS 135-size film cartridge is in use, photographic screens cannot be altered.

A film loaded in the JIS 135-size film cartridge is perforated on its sides as stipulated in JIS Standard K7519-1982 "135-size Film Cartridge" or ISO Standard 1007 "Photography-135-size Film and Magazine Specification." Due to the perforations, only 25.4 mm is ensured as an effective photographic width for a film width of 35 mm. Therefore, a standard photographic screen size is 24 mm by 36 mm as stipulated in JIS Standard B7115. The effective use rate in the direction orthogonal to the film feeding direction is 0.69 or a quotient of 25 by 35, which is smaller than 70%. Unlike photographs taken at an improved effective use rate at which the photographic screen size is increased fully within the film width of 35 mm, photographs taken in the standard photographic screen size must be enlarged greatly during printing. Therefore, the quality of a print image deteriorates.

The perforations are designed for intermittent feeding of cinefilm, and not always necessary for normal still cameras. Consequently, when perforation is abolished, larger photographic screens are provided. This results in a smaller enlargement ratio during printing. High-quality print images ensue.

OBJECTS AND SUMMARY OF THE INVENTION

The first object of the present invention is to provide a camera capable of performing photography in a standard photographic screen size of 24 mm by 36 mm specified in the JIS Standard B7115 when a film loaded in a camera body is perforated, and of performing photography in a photographic screen size larger than the specification when a film loaded is imperforated.

The second object of the present invention is to provide a camera capable of controlling a film feed depending on whether a film loaded in the camera is perforated or imperforated.

To be brief, the present invention provides a camera for supporting a film having perforations along its upper and lower edges and a film not having the perforations. The camera comprises masking plates for photographic screen size setting that are installed in a camera body to be freely movable between the inside and outside of perforations, a perforation detecting means for determining whether or not perforations are present at least along the edges of the photographic screen portion of a film loaded in the camera body, and a masking plate driving means for receiving an output of the perforation detecting means, moving the masking plates for screen size setting inside perforations when a film is perforated, and moving the masking plates for screen size setting outside of areas corresponding to the perforations when a film is imperforated.

The objects and advantages of the present invention will be further apparent in terms of the following detailed description.

BRIEF DESCRIPTION OF THE DRAWINGS

FIG. 23 is a front view of a normal perforated film with JIS dimensions indicated.

FIG. 23b is a plan view of a typical perforation on the film shown in FIG. 23a.

DETAILED DESCRIPTION OF THE PREFERRED EMBODIMENTS

The present invention will be described in conjunction with the drawings.

Figure 1:
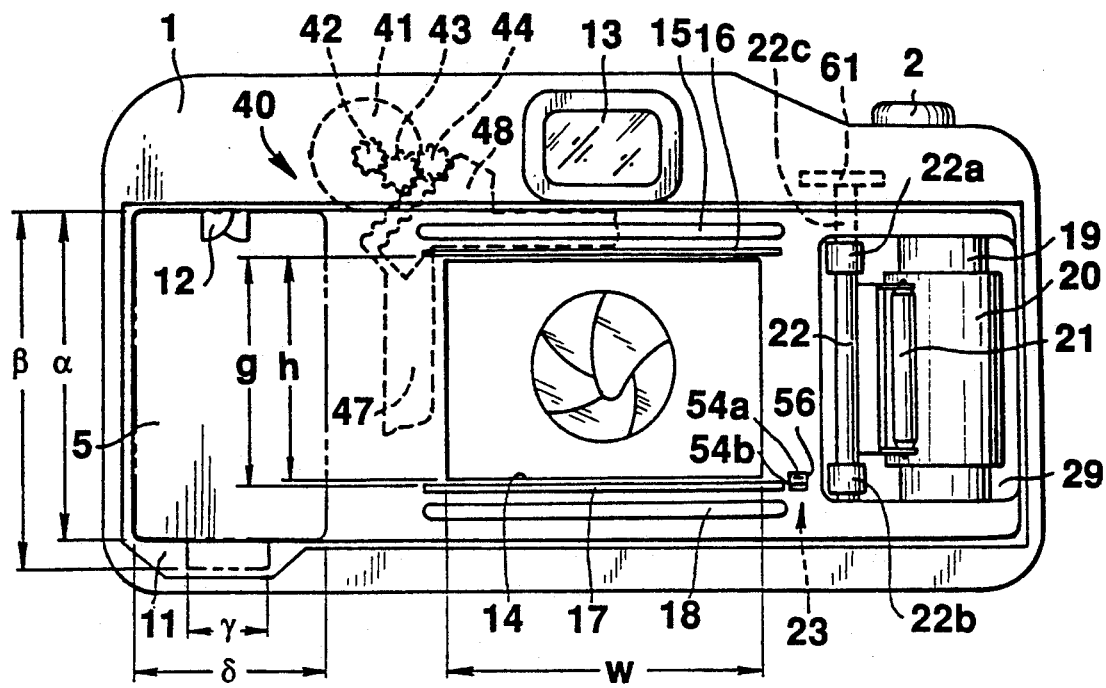
FIG. 1 is a back view of a camera showing an embodiment of the present invention.

FIG. 1 is a back view of a camera of an embodiment of the present invention with the back cover removed.

Figure 2:
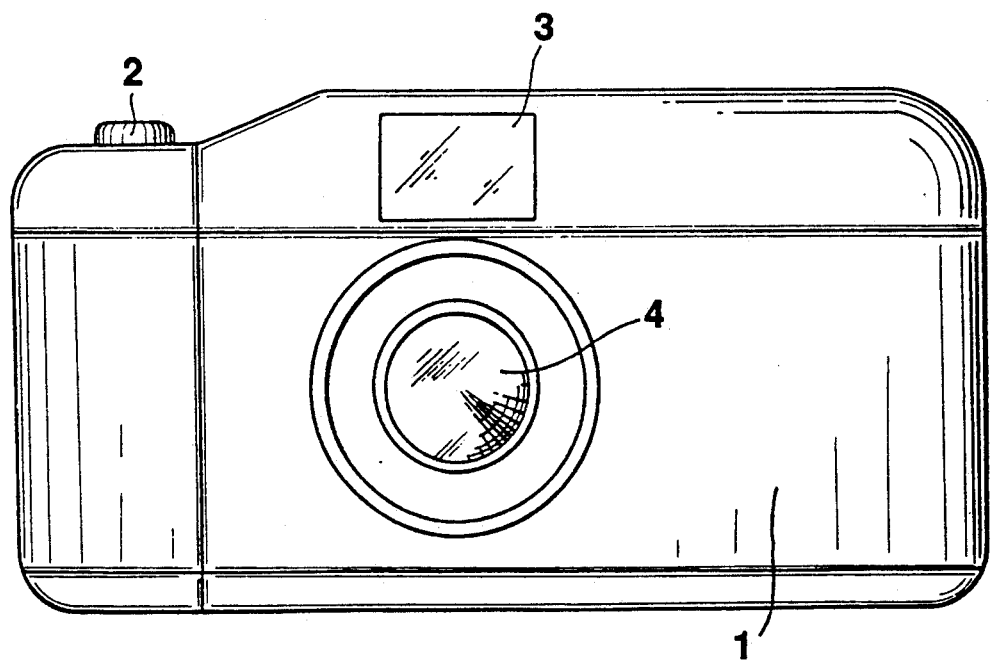
FIG. 2 is a front view of the camera of the embodiment of FIG. 1.

The camera has general photographic functions as well as functions derived from a configuration described below. As shown in a front view of FIG. 2, a release button 2 formed on one side of the top of a camera body 1, a photographic lens 4 formed in the front center of the camera body 1, and a finder window 3 formed above the photographic lens 4 have the same functions as those in a normal camera. The photographic lens 4 has a larger image circle than that in a normal camera for the reasons to be described later.

As shown in FIG. 1, a cartridge mounting chamber 11 serves as a film feeding chamber. A 135-size film cartridge 5 specified in JIS Standard K7519 (the outline is indicated with a dashed line with dimensions $\alpha$, $\beta$, $\gamma$, and $\delta$ in FIG. 1) can be mounted in the cartridge mounting chamber 11. The dimensions $\alpha$, $\beta$, $\gamma$, and $\delta$ represent the values listed in Table 1.

TABLE 1

| Symbol | Maximum | Minimum |
|---|---|---|
| $\alpha$ | 48.0 | 42.4 |
| $\beta$ | 48.0 | 46.9 |
| $\gamma$ | 11.4 | — |
| $\delta$ | 25.3 | 24.9 |

Unit: mm

A fork 12 for electrically rewinding film in the film cartridge 5 is formed on the ceiling of the cartridge mounting chamber 11, which is driven by a motor that is not shown. A finder eyepiece 13 is located on the center top of the back of the camera body 1. The finder eyepiece 13 is an eyepiece for a finder optical system 30 to be described later (See FIG. 4).

A mask 14 for defining a photographic screen area is formed on the center back of the camera body 1. In this embodiment, the mask 14 is 29 mm high and 40.75 mm wide. Thereby, the photographic screens have a size similar to an ISO A-type paper size and an aspect ratio of $1:\sqrt{2}$. With the above height and width, the diagonal length of a photographic screen is about 50.0 mm or larger than the diagonal length of a conventional photographic screen or about 43.3 mm. Therefore, the image circle of the photographic lens 4 is set larger than that of a photographic lens for a normal camera.

In this embodiment, as described above, the aspect ratio is set to $1:\sqrt{2}$. This aspect ratio provides a photographic screen size similar to an A-type paper size. The aspect ratio is not limited to $1:\sqrt{2}$ but may be set to any value that provides a letter size, a legal size, or other paper size generally used in the U.S. or other paper size adopted in the other overseas countries.

A photographic screen mask switching mechanism 40 to be described later is arranged inside the mask 14 in the camera body 1, which switches photographic screens.

Film rails 15, 16, 17, and 18 are laid in the film feeding direction above and beneath the mask 14. The outer film rails 15 and 18 or the inner film rails 16 and 17 share the same rail surface.

Figure 3:
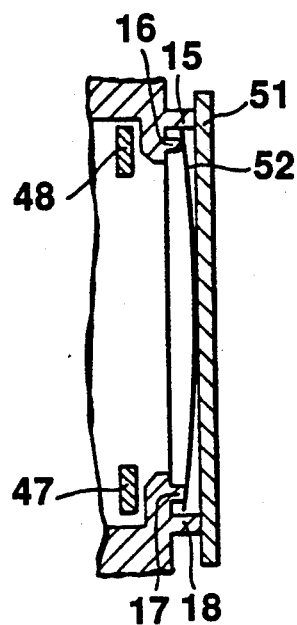
FIG. 3 shows a longitudinal cross section of a mask for the camera shown in FIG. 2.

FIG. 3 shows longitudinal cross sections of these film rails 15, 16, 17, and 18. In FIG. 3, a film 52 loaded in a film cartridge 5 has been pulled out and stretched, then a back cover, which is not shown, is closed. A film platen 51 arranged inside the back cover has, as already disclosed, the inner surfaces of its upper and lower edges pressed on the fronts of the film rails 15 and 18. The film platen 51 presses the center of the film 52 inward to even the film 52. A film guide for feeding the film 52 smoothly is formed between the film platen 51 and the fronts of the film rails 16 and 17 located inside the film platen 51. The distance g between the insides of the film rails 15 and 18 is slightly larger than a film width 35 mm in the same manner as that in a normal camera.

A film take-up chamber 29 is formed on the opposite side of the cartridge mounting chamber 11 with respect to the mask 14. A film advancing spool 19 of the same kind as that for a normal camera is installed in the film take-up chamber 29. A rubber belt 20 yielding a large frictional force is wound around the center of the spool 19, ensuring reliable loading even for an imperforated film.

The spool 19 is driven by a film advancing/rewinding motor 108, and automatically rotates in a given direction to advance the leader of a film or one exposed film frame during photography. To be more specific, after a film cartridge 5 is loaded in the cartridge mounting chamber 11, the leader of a film in the cartridge is positioned properly, then the back cover (not shown) is closed. After that, a back cover switch 103 (See FIG. 16) is turned on. At the same time, a built-in film advancing/rewinding motor 108 (See FIG. 16) is controlled by a film advancing/rewinding drive circuit 107 that operates in response to an instruction from a CPU 101 (See FIG. 16). Then, the film advancing/rewinding motor 108 drives the spool 19.

An assistant roller 21 held by assistant roller arms 71a and 71b (FIGS. 12 and 13) that have their proximal portions fixed on the camera body 1 to swing freely is arranged in such a manner that the surface of the roller 21 will be in contact with the surface of the rubber belt 20 on the spool 19. The assistant roller 21 assists the rotating spool 19 in winding and loading film 52.

On the side of the mask 14 in the vicinity of the assistant roller 21, a film feed detection roller axle 22 is replaced in parallel with the spool 19. Detection rollers 22a and 22b made of rubber having a large frictional force are attached to the upper and lower parts of the film feed detection roller axle 22. The detection rollers 22a and 22b are brought into contact with the inner upper and lower edges of film 52 when the film 52 is loaded. The rotations of the detection rollers 22a and 22b are interlocked with the loading of the film 52. Therefore, the film feed detection roller axle 22 rotates according to a feed of the film 52. A rotary disk 61 making up a pulse generation mechanism for film feed detection which will be described later is fixed on the upper portion 22c of axle 22 extending inward of the camera body 1. A pulse signal is generated according to a quantity of rotation of the film feed detection roller axle 22. Thereby, the CPU 101 measures a film feed.

A perforation detection switch 23 is located on the side of the mask 14 in the vicinity of the detection roller 22b in the lower part of the film feed detection roller axle 22. The perforation detection switch 23 serves as a contact switch for detecting the presence or absence of perforations and for supplying pulse signals to a film feed switching means 85 and a film feed counting means 86 (See FIG. 16), which will be described later. When a film 52 is loaded, if the film 52 is perforated, the perforations pass through a through hole 56 bored at a given position on a camera body wall 55 located between the detection roller 22b and mask 14 (See FIG. 7). Contacts of contact springs 54a and 54b making up part of the perforation detection switch 23 are arranged in the through hole 56.

Figure 4:
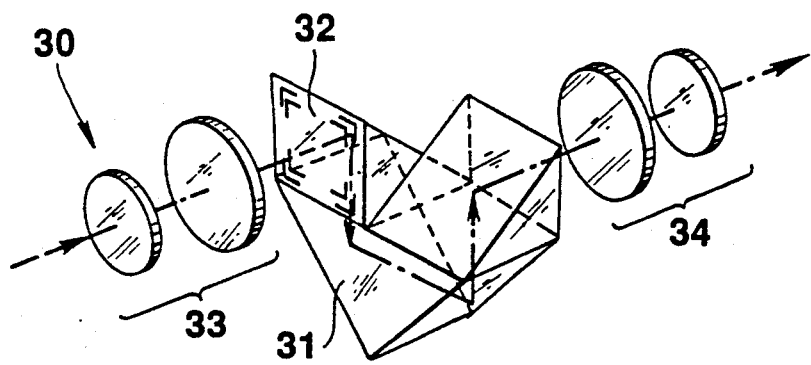
FIG. 4 is an oblique view of a finder optical system used in the camera of the embodiment of FIG. 1.

FIG. 4 is an oblique view showing a configuration of a finder optical system 30 capable of changing field frame sizes.

The optical system is formed with a real image type finder optical system made up of objectives 33, a Porro prism 31, and eyepieces 34. A transmission type liquid crystal plate 32 capable of displaying a large-screen field frame 32a and a normal-screen field frame 32b is placed on the incident plane of the Porro prism 31. Then, the field frames are switched electrically. The large-screen field frame 32a and the normal-screen field frame 32b the transmission type liquid crystal plate 32 displays look like FIGS. 5a and 5b.

Switching the displays of the transmission type liquid crystal plate 32 is controlled by a finder frame switching liquid crystal drive circuit 106 (See FIG. 16) that operates in response to an instruction from CPU 101.

Figure 6:
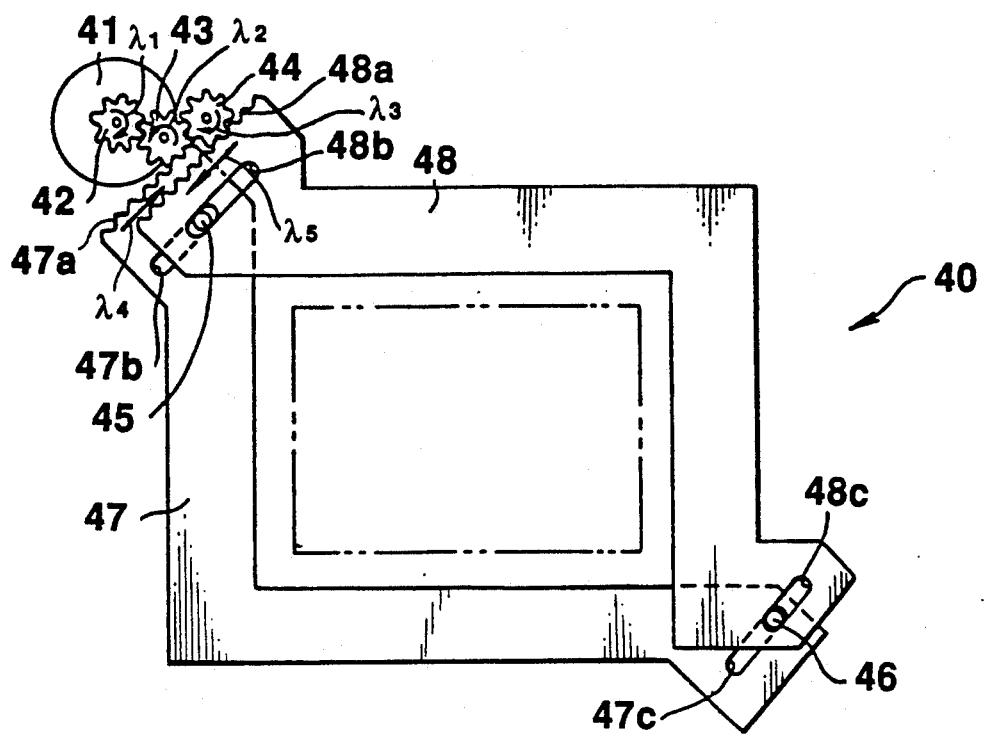
FIG. 6 is a front view of a photographic screen mask switching mechanism in the camera of the embodiment of FIG. 1.

FIG. 6 shows a configuration of a photographic screen mask switching mechanism 40. The mask switching mechanism 40 is incorporated in a camera body 1, wherein a screen size switching motor 41 is actuated to switch the mask sizes for large and normal screens.

The rotation of the screen size switching motor 41 is controlled by a screen size switching motor drive circuit 104 (See FIG. 16) that operates according to an instruction from CPU 101. The switching motor 41 has an output gear 42 which is engaged with a pinion 43 mounted to be freely rotatable. The pinion 43 is engaged with a pinion 44 mounted to be freely rotatable. Mask frames 47 and 48 are respectively driven by the pinions 43 and 44 to change their positions. The mask frames 47 and 48 are L-shaped frame plates opposed to each other, and move in their respective diagonal directions.

Racks 47a and 48a are formed on edges extending upward in the diagonal directions from lower ends of the mask frames 47 and 48. The racks 47a and 48a respectively engage with the pinions 43 and 44. Elongated guide holes 47b and 48b, and 47c and 48c are bored in the extensions on the diagonal lines of the mask frames 47 and 48. The elongated guide holes are fitted to receive guide pins 45 and 46.

In the photographic screen mask switching mechanism 40 having the aforesaid composition, when the screen size switching motor 41 rotates in the arrow $\lambda 1$ direction, the pinions 43 and 44 rotate in the arrows $\lambda 2$ and $\lambda 3$ directions. Then, the racks 47a and 48a of the mask frames 47 and 48 linearly move in the directions respectively shown by arrows $\lambda 4$ and $\lambda 5$. Thereby, the mask frames 47 and 48 move inward toward the optical axis to reduce the intra-frame area, and thus produce a mask of a normal screen size. When the screen size switching motor 41 rotates in the reverse direction of the arrow $\lambda 1$, the mask frames 47 and 48 respectively move in the reverse direction of the direction mentioned above to widen the intra-frame area, and thus produce a mask of a large photographic screen size.

Figure 7:
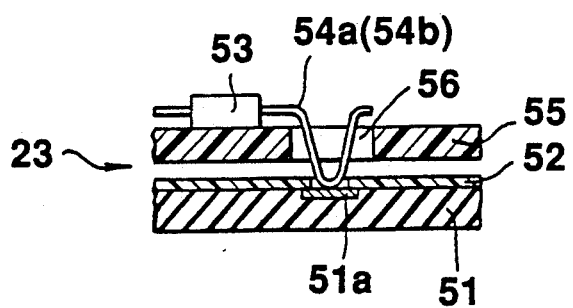
FIG. 7 shows an enlarged cross section of a perforation detection switch in the camera of the embodiment of FIG. 1.

FIG. 7 shows an enlarged cross section of a main section of a perforation detection switch 23.

A film platen 51 is a film pressure plate installed inside a back cover (not shown) as described previously. A conducting member 51a is fixed on the film platen 51. When a perforated film 52 is loaded, the conducting member 51a faces every perforation of the film 52.

On the other hand, contact springs 54a and 54b are made of phosphor bronze or other elastic conducting material. The proximal portions of the contact springs 54a and 54b are locked in a contact spring support 53 fixed at a given position inside a camera body 1. The distal portions of the contact springs 54a and 54b are bent towards the conducting member 51a to form bends. The bends pass through a through hole 56 and reach the film platen 51. Using the apices as contacts, the bends are opposed to the conducting member 51a. The terminals of the contact springs 54a and 54b are connected to input pins P5 and P6 of CPU 101 (See FIG. 16). Depending on whether or not the contact springs 54a and 54b are short-circuited, the CPU 101 detects the presence or absence of perforations, and receives pulses for feed control via input pins P11 and P12.

When a perforated film 52 is mounted and loaded, perforations pass between the contacts of the contact springs 54a and 54b and conducting member 51a. Then, the contacts penetrate through the perforations, touch the conducting member 51a, and are then short-circuited. Thus, with feeding of the film 52, given pulses are transmitted to the CPU 101. When detecting the pulses, the CPU 101 becomes aware of the presence of perforations. When the film mounted 52 is imperforated, the contacts of the contact springs 54a and 54b are in contact with the surface of the film 52 and cut off from the conducting member 51a. Therefore, the CPU 101 has no pulse input, and thereby determines that perforations are not present.

Figure 8:
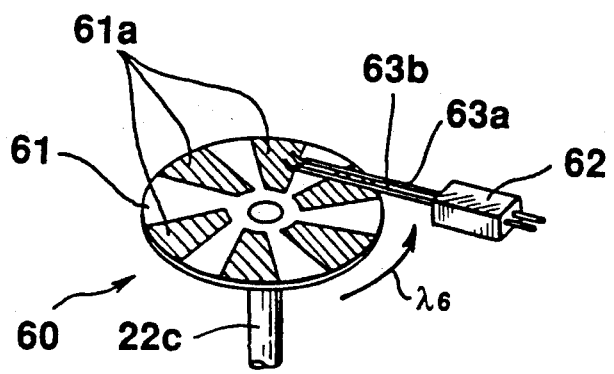
FIG. 8 is an oblique view showing a main section of a pulse generation mechanism for film feed detection in the camera of the embodiment of FIG. 1.

FIG. 8 is an oblique view showing a configuration of a pulse generation mechanism 60 for film feed detection.

A rotary disk 61 uses the upper part 22c of a film feed detection roller axle 22 as a center axle, and rotates interlocked with the film feed detection roller axle 22 or according to a film feed. On the top of the rotary disk 61, copper foil 61a is adhered radially from the center axis at regular intervals. In FIG. 8, six sheets of copper foil 61a are adhered. The number of copper foil sheets is not limited to six but may be any value.

On the top of the rotary disk 61, contact springs 63a and 63b similar to the contact springs 54a and 54b are arranged in parallel with the tangent of the rotary disk 61 so that the contacts of the contact springs 63a and 63b will be in contact with the top of the rotary disk 61. The contact springs 63a and 63b have, similar to the contact springs 54a and 54b, their proximal portions locked in a contact spring support 62, and their proximal ends connected to input pins P7 and P8 of the CPU 101.

When a film 52 is mounted and loaded, the film feed detection roller axle 22 rotates according to a feed of the film 52. Then, the rotary disk 61 rotates interlocked with the film feed detection roller axle 22 in the direction of arrow λ6 shown in FIG. 8. At this time, the contacts of the contact springs 63a and 63b are short-circuited through the copper foil 61a to generate pulses. Then, with the pulse signal made up of the pulses, the CPU 101 identifies the feed of the film 52. The details will be described later.

Figure 9:
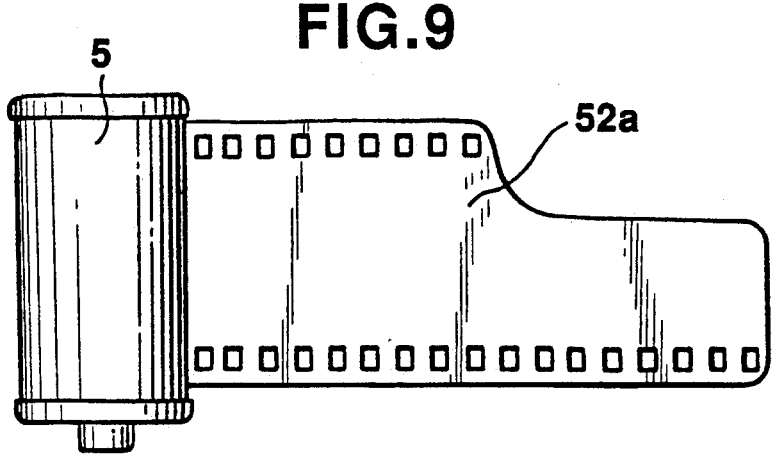
FIG. 9 is a front view showing a normal perforated film of 35 mm wide.
Figure 23A:
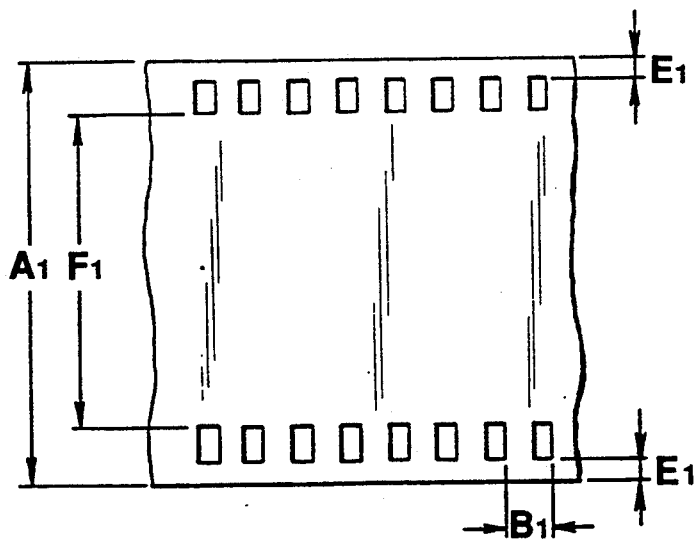
Figure 23B:
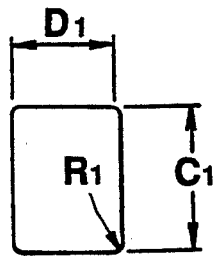

In FIG. 9, the leader of perforated film 52a is pulled out from a normal 135-size film cartridge 5. The detailed dimensions of the film 52a are shown in FIGS. 23a and 23b and listed in Table 2.

TABLE 2

| Symbol | Dimension (mm) |
| --- | --- |
| A1 | 35 |
| B1 | 4.75 |
| C1 | 2.8 |
| D1 | 1.98 |
| E1 | 2.0 |
| F1 | 25.4 |
| R1 | 0.5 |

Tolerances are omitted.

Figure 10:
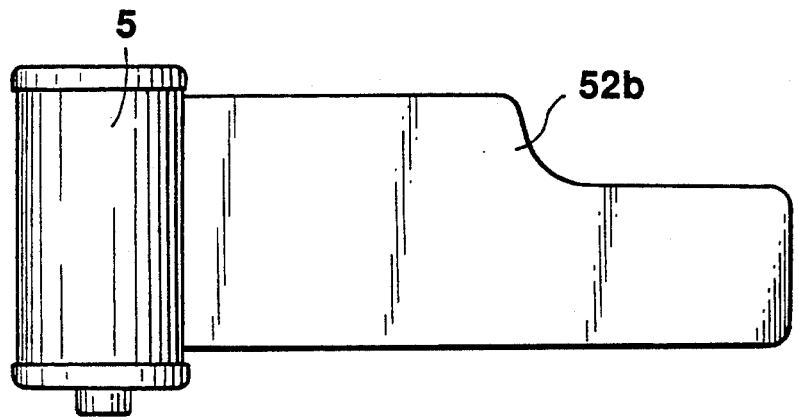
FIG. 10 is a front view showing an imperforated film of 35 mm wide.

In FIG. 10, the leader of a 35 mm-wide imperforated film or a large photographic screen film 52b is pulled out from a 135-size film cartridge 5.

Figure 11:
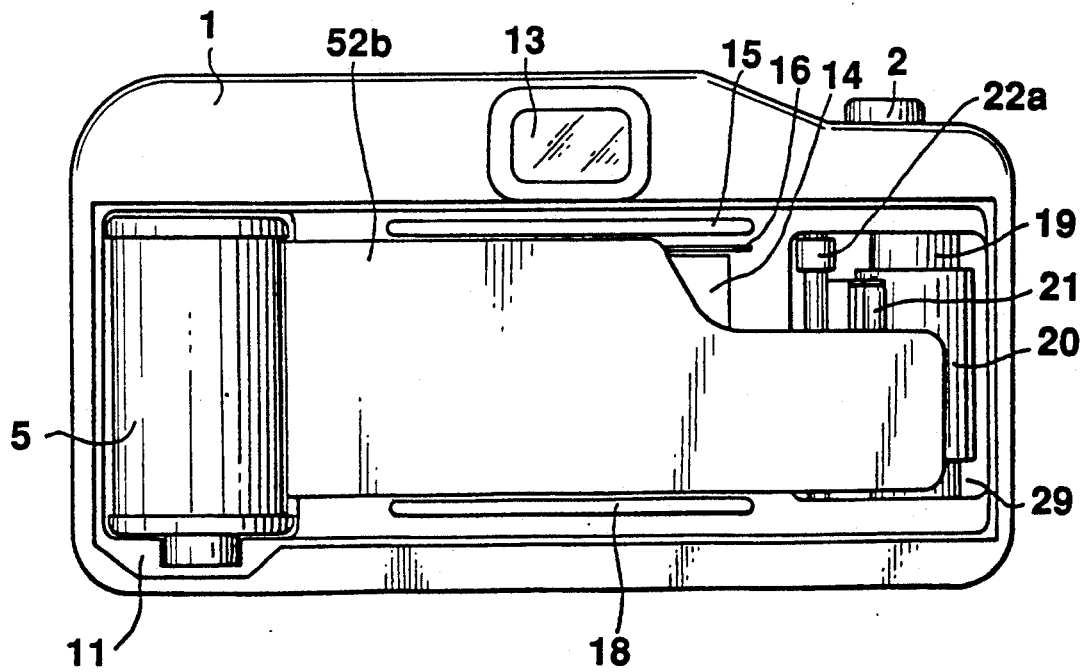
FIG. 11 is a back view of a camera with the imperforated film of FIG. 10 loaded.

Next, film loading for an imperforated film 52b in a film cartridge 5 that has been mounted in a camera body 1 as shown in FIG. 11 will be described in conjunction with FIGS. 12 to 15.

FIGS. 12 to 15 are cross-sectional diagrams of a film take-up chamber 29 of FIG. 1, showing the progressive steps of film loading in that order.

Figure 12:
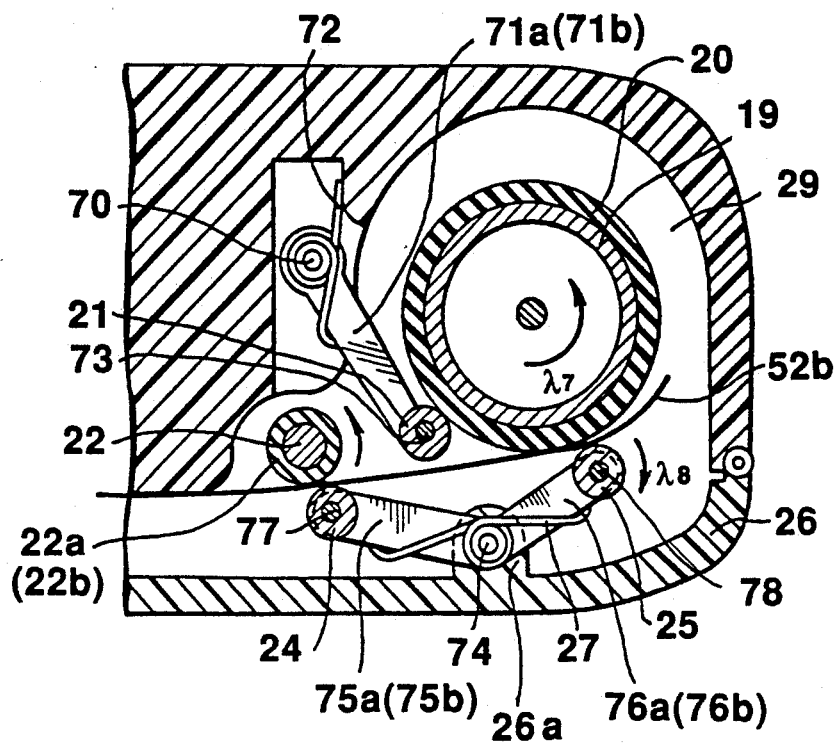
FIG. 12 is a cross-sectional diagram of a main section showing film loading in the camera of the embodiment of FIG. 1.

In FIG. 12, assistant roller arms 75a, 75b, 76a, and 76b have their proximal ends fixed on a back cover 26 of a camera in such a manner that they can swing freely, and hold assistant rollers 24 and 25 in parallel with a spool 19. To be more specific, a spindle 74 is resting on a projection 26a or part of the back cover 26 that is projecting inward toward the film take-up chamber 29. The assistant roller arms 75a, 75b, 76a, and 76b have their proximal ends pivoted on the spindle 74 so that they can swivel freely. Spindles 77 and 78 are placed between the distal ends of the assistant roller arms 75a and 75b, and 76a and 76b. The assistant rollers 24 and 25 are attached to the spindles 77 and 78 in such a way that the assistant rollers can rotate freely. Then, the middle portion of a constraining spring 27 is wound around the spindle 74. The constraining spring 27 has its extending ends respectively hooked on to the assistant roller arms 75a and 76a. Thus, the surface of the assistant roller 24 is pressed on film feed detection rollers 22a and 22b, and the other assistant roller 25 is pressed on a rubber belt 20 of the spool 19. The assistant rollers 24 and 25 assist in loading the film 52.

On the other hand, on the wall of a camera body beyond the spool 19, a recess is formed, and assistant roller arms 71a and 71b are holding an assistant roller 21. More particularly, the proximal portions of the assistant roller arms 71a and 71b are located in the recess of the camera body. The assistant roller arms 71a and 71b have their proximal ends pivoted on a spindle 70 so that they can rotate freely. The distal ends of the assistant roller arms 71a and 71b extend between the spool 19 and the film feed detection roller axle 22 in the film take-up chamber 29. A spindle 73 is placed between the distal ends of the assistant roller arms 71a and 71b and extends in parallel with the spool 19. An assistant roller 21 is attached to the spindle 73 in such a manner that the assistant roller 21 can rotate freely. A constraining spring 72 has its middle portion wound around the spindle 70, one of its ends hooked on to the assistant roller arm 71a, and the other end hooked on to a portion of the camera body 1. The constraining spring 72 normally urges the surface of the assistant roller 21 into contact with the rubber belt 20. The assistant roller 21 assists the spool 19 in rotating and loading the film 52.

Figure 13:
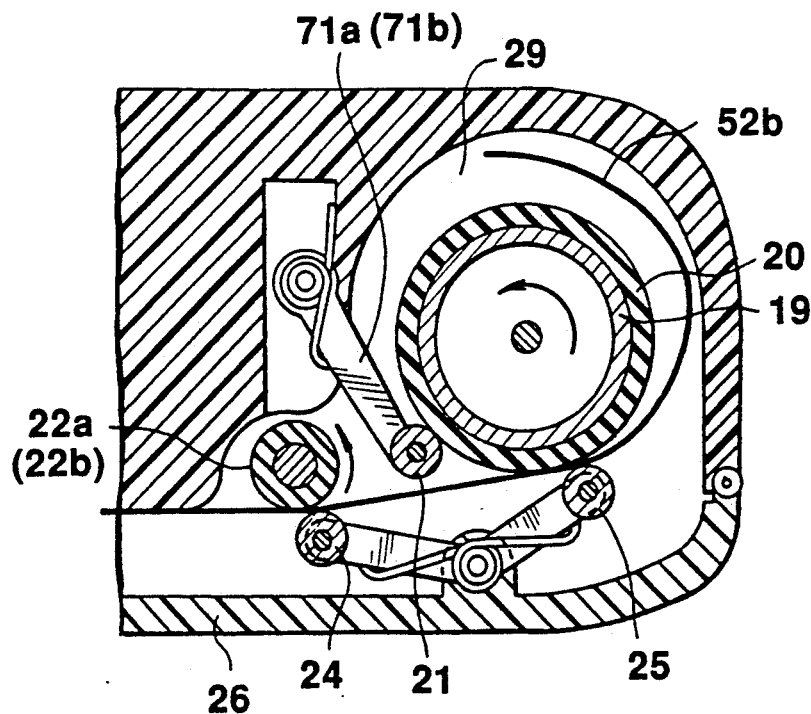
FIG. 13 is a cross-sectional diagram of the main section showing film loading in the camera of the embodiment of FIG. 1.
Figure 14:
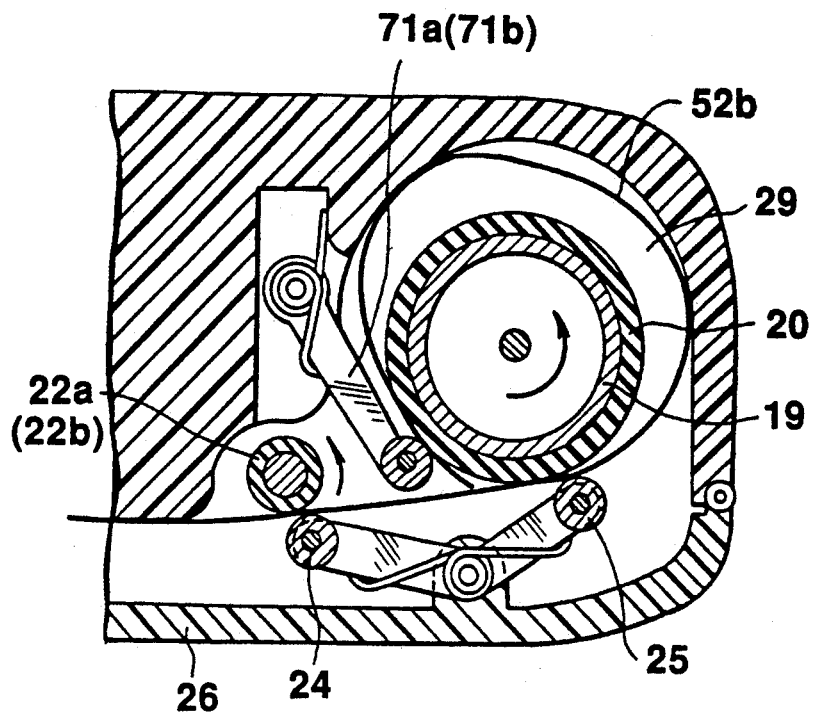
FIG. 14 is a cross-sectional diagram of the main section showing film loading in the camera of the embodiment of FIG. 1.

First, as shown in FIG. 11, a film cartridge 5 of an imperforated film is mounted, the film 52b is pulled out and loaded, then a back cover 26 is closed. Then, the film 52b is positioned as shown in FIG. 12. That is to say, the distal portion of the film 52b is caught between a rubber belt 20 wound around a spool 19 and an assistant roller 25 applying a pressing habit to the rubber belt 20 with the help of the constraining spring 27. When the back cover 26 is closed, as described later, a back cover switch 103 (See FIG. 16) is turned on to start loading. To be more specific, the spool 19 rotates in the arrow λ7 direction, and the rubber belt 20 and assistant roller 25 respectively rotate in the arrows λ7 and λ8 directions. With the rotations, the film 52b is wound up around the spool 19 as shown in FIGS. 13 and 14.

Figure 15:
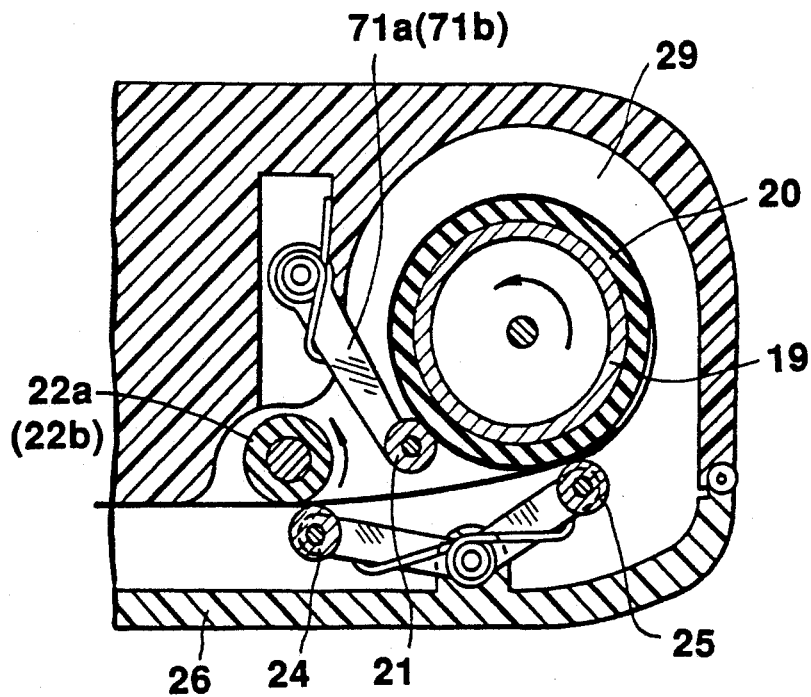
FIG. 15 is a cross-sectional diagram of the main section showing film loading in the camera of the embodiment of FIG. 1.

At this time or when the film 52b is loaded, a perforation detection switch 23 determines whether the film 52b is perforated or not. Then, a pulse generation mechanism for film feed detection 60 measures the feed of the film 52b. Then, when the feed reaches a given value, loading is stopped and a release standby state is set. FIG. 15 shows the film 52b in this state.

Figure 16:
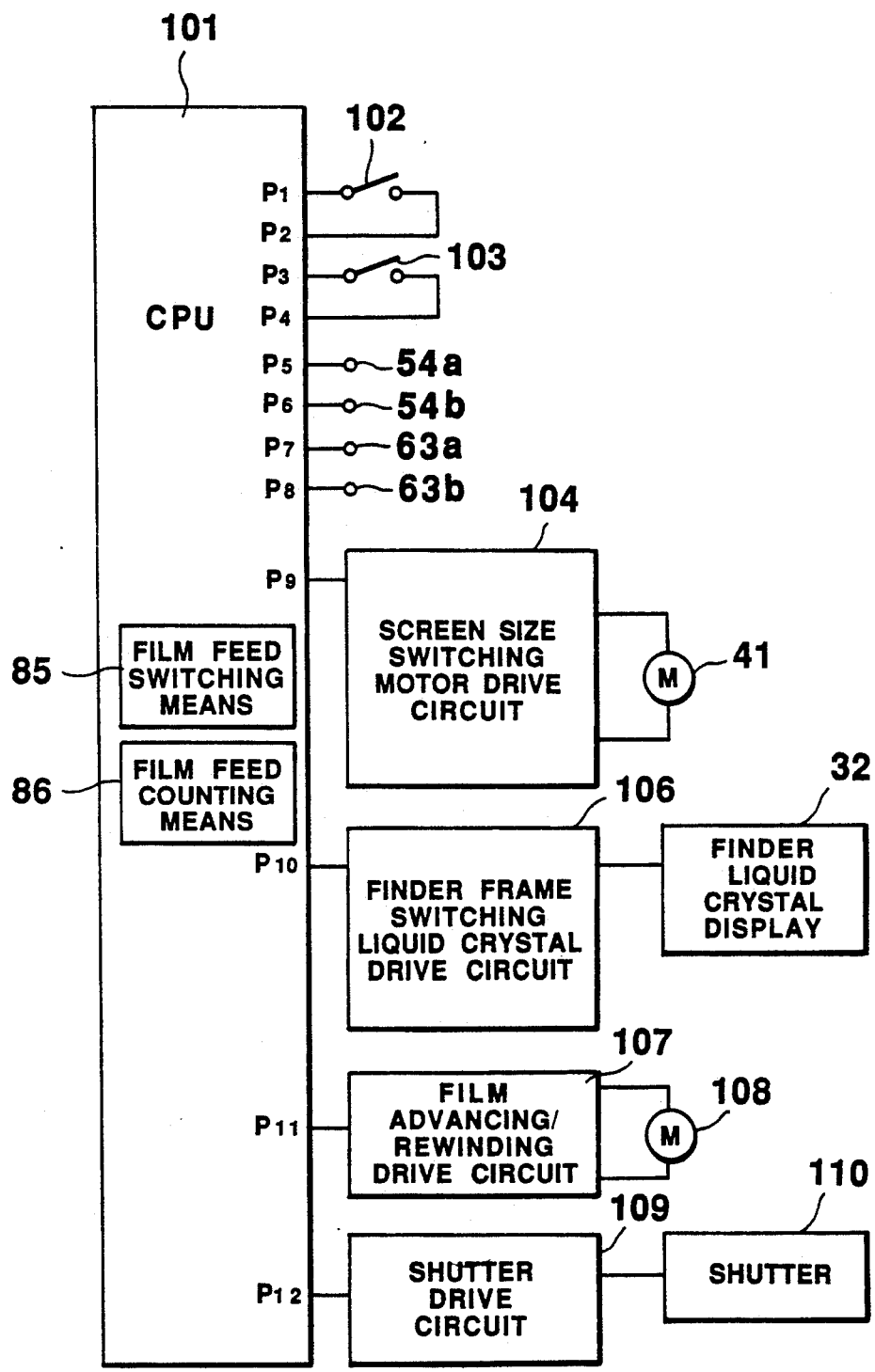
FIG. 16 is a block diagram showing a composition of electric circuits in the camera of the embodiment of FIG. 1.

FIG. 16 is a block diagram of electrical circuits showing a composition of CPU 101 for controlling the operation of a camera of this embodiment and its peripheral circuits.

CPU 101 serves as a controller for controlling electrical circuits in a camera of this embodiment. Input pins P1 and P2 are connected to a release switch 102, and input pins P3 and P4, to a back cover switch 103. Input pins P5 and P6 are connected to switches formed with contact springs 54a and 54b. Input pins P7 and P8 are connected to switches formed with contact springs 63a and 63b. The CPU 101 monitors signals entering the input pins all the time. When given signals enter these input pins, the CPU operates accordingly (described later).

A screen size switching motor drive circuit 104, a finder frame switching liquid crystal drive circuit 106, a film advancing/rewinding drive circuit 107, and a shutter drive circuit 109 are connected to output pins P9, P10, P11, and P12 of the CPU 101. The CPU 101 processes input signals of the input pins and controls the drive circuits.

The screen size switching motor drive circuit 104 has its output pin connected to the screen size switching motor 41, and thereby drives and controls the switching motor 41 as described previously. The finder frame switching liquid crystal drive circuit 106 has its output pin connected to the transmission type liquid crystal plate 32, and thereby controls the screen display of the transmission type liquid crystal plate 32. The film advancing/rewinding drive circuit 107 has its output pin connected to a film advancing/rewinding drive motor 108, and thereby controls drive of the motor 108 as described previously. The shutter drive circuit 109 has its output pin connected to a shutter 110, and thereby controls opening and closing of the shutter 110.

In the CPU 101, a film feed switching means 85 and a film feed counting means 86 are incorporated.

The film feed switching means 85 switches film feeds according to an output pulse signal sent from the perforation detection switch 23. To be more specific, the film feed switching means 85 instructs the film feed counting means 86 to count pulses originating from the contact springs 54a and 54b so that feed control will be done according to an output pulse signal sent from the perforation detection switch 23. Alternatively, the film feed switching means 85 instructs the film feed counting means 86 to count pulses originating from the contact springs 63a and 63b so that feed control will be done according to a pulse signal sent from the pulse generation mechanism 60 for film feed detection.

Figure 18:
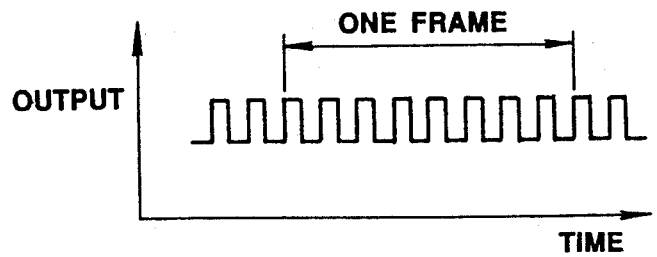
FIG. 18 shows a pulse signal derived from perforations on a film in the camera of the embodiment of FIG. 1.

The film feed counting means 86 controls drive of the film advancing/rewinding motor 108 in response to an instruction from the film feed switching means 85, thus performing film feed control. When a film is perforated, the film feed counting means 86 instructs the film advancing/rewinding drive circuit 107 to count up one frame in units of eight pulses originating from the contact springs 54a and 54b as shown in FIG. 18. When a film is imperforated, the film advancing/rewinding drive circuit 107 is instructed to count up one frame in units of 18 pulses originating from the contact springs 63a and 63b, and to advance the film with each count.

A specific procedure for the foregoing film feed control will be described in detail later.

Figure 17:
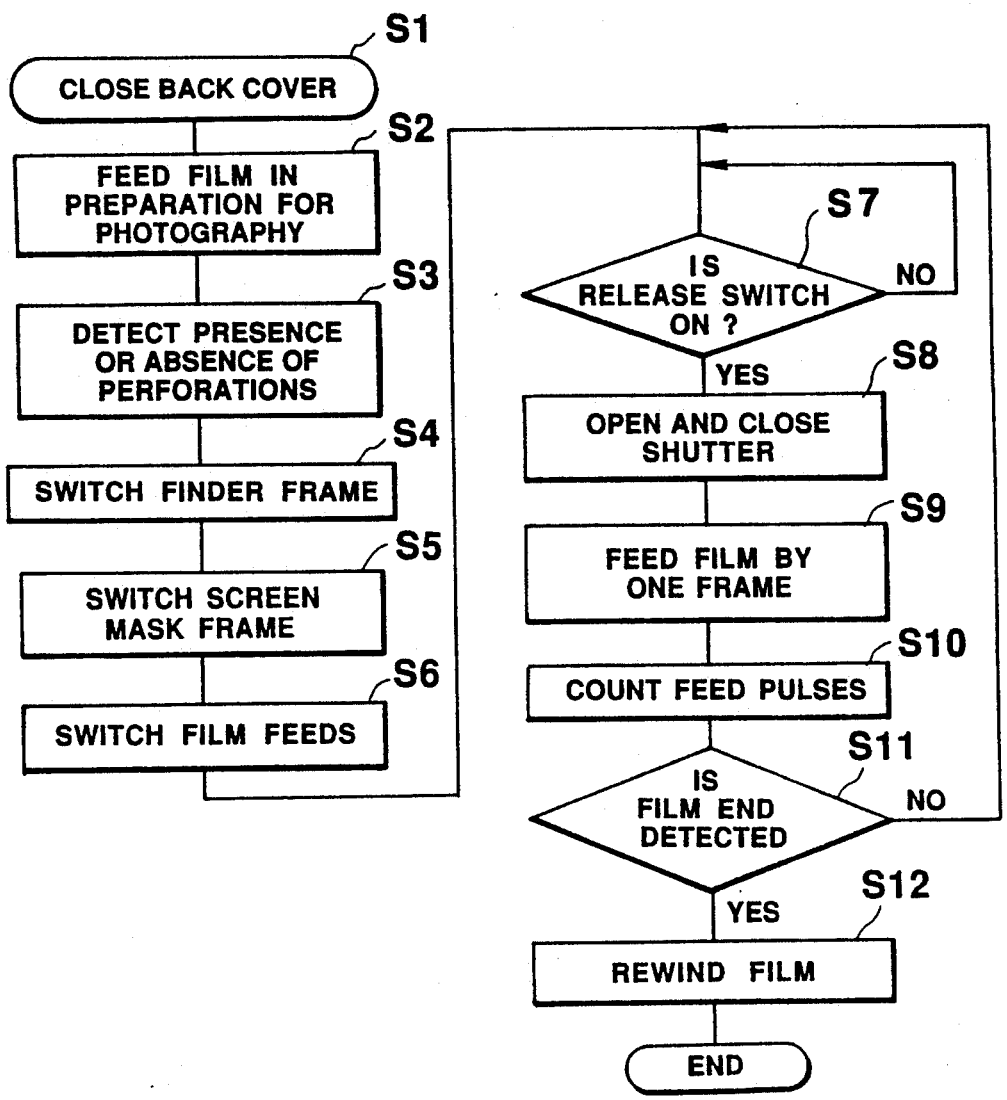
FIG. 17 is a flowchart showing the operation of the camera of the embodiment of FIG. 1.

The operation of a camera of this embodiment having the aforesaid configuration will be described in conjunction with the flowchart of FIG. 17.

First, a 135-size film cartridge 5 is mounted in a cartridge mounting chamber 11 of a camera body 1. A film 52 is pulled out from the film cartridge 5 and aligned at a given position. Then, a back cover 26 is closed. Then, a back cover switch 103 is turned on to input an On signal to a CPU 101 (step S1). Thereby, the CPU 101 outputs a control signal via an output pin P11. In response to the control signal, a film advancing/rewinding drive circuit 107 rotates film advancing/rewinding motor 108 to start feeding the film 52 in preparation for photography (step S2).

Next, the CPU 101 instructs a perforation detection switch 23 to determine whether the film 52 is perforated or not (step S3). In response to the result, the CPU 101 outputs a control signal via an output pin P10, and actuates a finder frame switching liquid crystal drive circuit 106 to switch displays of a transmission type liquid crystal plate 32 (step S4). At the same time, the CPU 101 outputs a control signal via an output pin P9, and actuates screen size switching motor drive circuit 104 to rotate screen size switching motor 41. Thus, a given photographic screen size is selected (step S5).

Figure 5A:
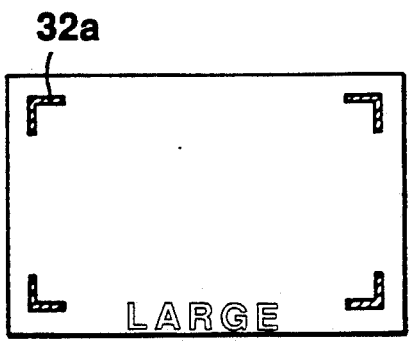
FIG. 5a is a front view showing a finder field frame for large-screen photography in the camera of the embodiment of FIG. 1.
Figure 5B:
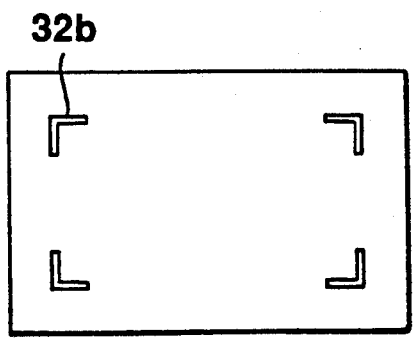
FIG. 5b is a front view showing the finder field frame for normal photography.

If the film 52 is imperforated, the CPU 101 instructs to select the screen display shown in FIG. 5a for the transmission type liquid crystal plate 32, and to increase the size of a mask the photographic image screen changing mechanism 40 produces, or more particularly, to specify a mask size of 29 mm by 40.75 mm. If the film 52 is perforated, or if a normal film cartridge is mounted, the CPU 101 instructs to select the screen display shown in FIG. 5b for the transmission type liquid crystal plate 32, and to shrink the mask frames of the photographic screen mask changing mechanism 40, or more particularly, to specify a mask size of 24 mm by 36 mm.

Next, the CPU 101 instructs (step S6) the film advancing/rewinding drive circuit 107 to count pulses originating from contact springs 54a and 54b, and thus performs feed control according to an output pulse signal sent from the perforation detecting switch 23. Alternatively, the CPU 101 instructs the film advancing/rewinding drive circuit 107 to count pulses originating from contact springs 63a and 63b, and thus performs feed control according to a pulse signal sent from the pulse generation mechanism for film feed detection 60.

Herein, an example of setting a feed will be described.

Figure 21:
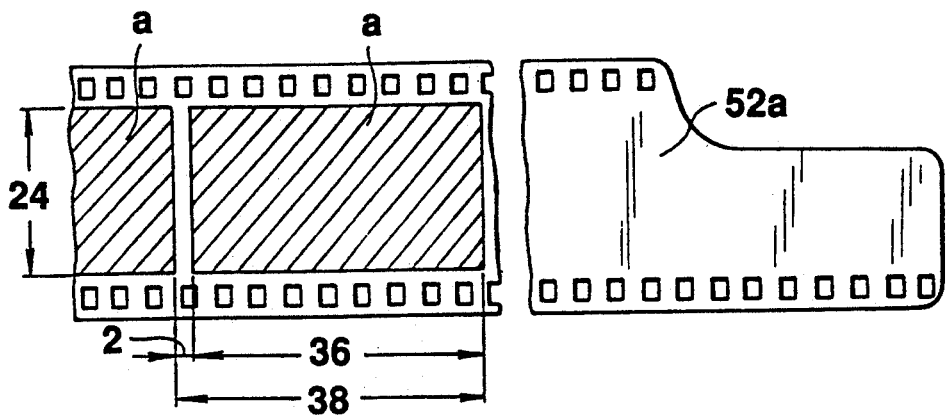
FIG. 21 is a front view showing photographic screens of a perforated film.

In FIG. 21, hatched areas represent screens a of a perforated normal film 52a that have been exposed during photography. As shown in FIG. 21, the photographic screen size is 24 mm by 36 mm and the spacing of photographic screens is 2 mm. Therefore, the film feed per frame will be 38 mm. Since the film has perforations, one frame is counted up in units of eight pulses originating from the contact springs 54a and 54b as shown in FIG. 18. Then, the film is fed with every count.

Alternatively, the diameters of detection rollers 22a and 22b may be determined so that when a film feed detection roller axle 22 rotates 2.7 turns, the pulse generation mechanism for film feed detection 60 will generate 16 pulses for each film frame. Then, film feed control may be done according to a pulse signal sent from the pulse generation mechanism 60 for film feed detection; that is, pulses originating from the contact springs 63a and 63b.

Thereby, when a perforated film 52a is loaded, normal photographic screens a are exposed in the same manner as those exposed using a general camera. The CPU 101 can control the positions of perforations relative to the position of a photographic screen mask so that a perforation will not interpose between photographic screens.

Figure 22:
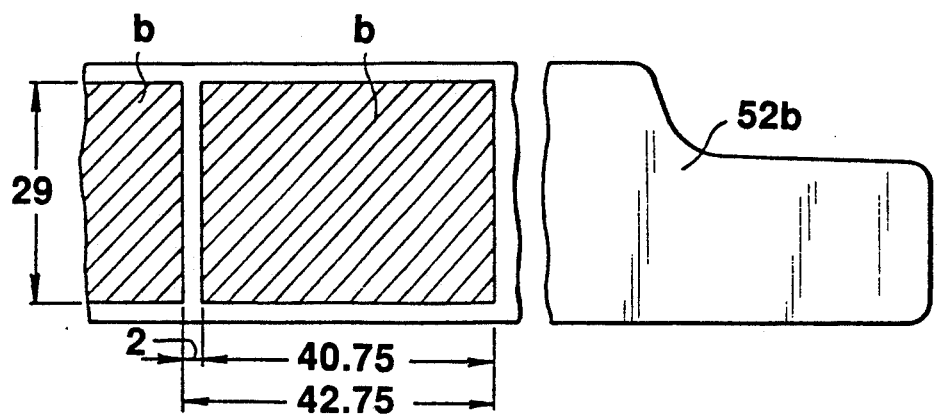
FIG. 22 is a front view showing photographic screens of an imperforated film.

In FIG. 22, hatched areas represent screens b of a film 52 not having the aforesaid perforations that have been exposed during photography. Assuming that, as shown in FIG. 22, the photographic screen size is 29 mm by 40.75 mm and the spacing of photographic image planes is 2 mm, the film feed per frame will be 42.75 mm. Therefore, when the diameters of the film feed detection rollers 22a and 22b are determined as described above, the detection rollers 22a and 22b rotate three turns for each film frame and the pulse generation mechanism 60 for film feed detection generates 18 pulses. Under these conditions, the CPU 101 achieves film feed control according to a pulse signal sent from the pulse generation mechanism 60 for film feed detection or pulses originating from the contact springs 63a and 63b.

The operation of the CPU 101 will be described in conjunction with FIG. 17.

By a step S6, camera initialization terminates. The camera enters a release standby state (step S7). After that, a release switch 102 is turned on. Then, CPU 101 outputs a control signal via an output pin P12, and actuates a shutter drive circuit 109 to open and close a shutter 110 (step S8). Then, a film advancing/rewinding motor 108 is rotated to feed a film 52 by one frame (step S9). At this time, the CPU 101 counts feed pulses as described previously, and controls the film feed on the basis of a film feed selected at the step S6 (step S10).

After that, a film end is detected (step S11). At the step S11, when the film end is not detected, if the film 52 still has unexposed frames, control returns to a step S7 to put the camera into the release standby state. On the other hand, if the film end is detected at the step S11, the CPU 101 issues an instruction to a film advancing-/rewinding drive circuit 107, and thereby rewinds the film 52 (step S12).

Figure 19:
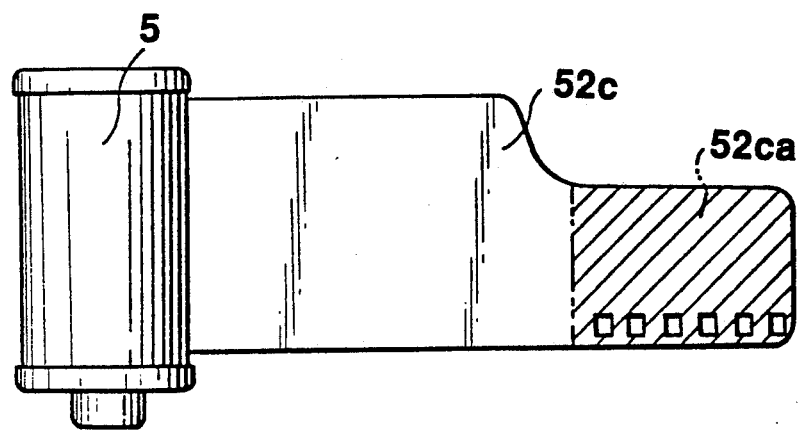
FIG. 19 shows a 35 mm-wide film having perforations only in its leader.
Figure 20A:
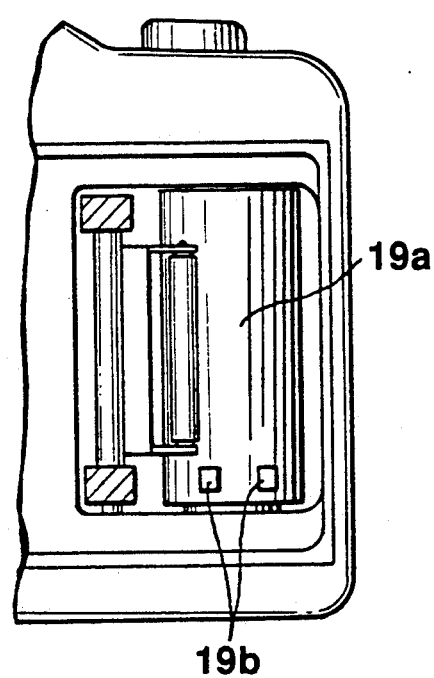
FIG. 20a is a front view of a take-up spool for taking up the leader of a film shown in FIG. 19.
Figure 20B:
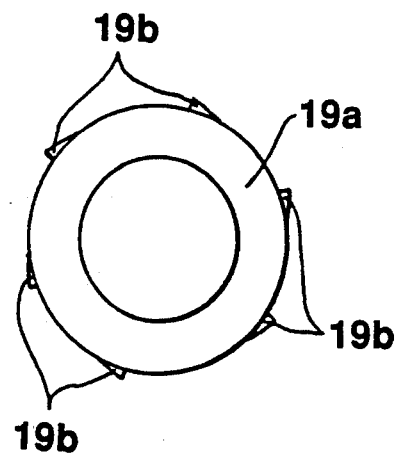
FIG. 20b is the cross-sectional diagram.

FIG. 19 shows a film 52c or an imperforated film having perforations only in its distal portion or leader 52ca for more reliable film loading. FIGS. 20a and 20b are explanatory diagrams showing a spool 19a or a spool 19 having film hitching claws 19b on its lower part. FIG. 20a is a back view of a film take-up chamber 29a in which the spool 19a is placed. FIG. 20b is a cross-sectional diagram of the spool 19a.

When the film 52c is mounted in a camera body 1 and loaded, the perforations in the leader 52ca are hitched by the film hitching claws 19b on the spool 19a and thus the film 52c is wound up. This permits reliable loading. With the loading, the film 52c is fed by two to three frames. Therefore, a perforation detection switch 23 assuredly recognizes the film as imperforated film. This means that the employment of the film 52c also permits large screen photography.

In the aforesaid embodiment, a movable member is used as a masking means to switch photographic screen sizes. Alternatively, an electric optical means using a liquid crystal may be employed to switch photographic screen sizes. Otherwise, masking plates of a large screen size may be installed in a camera body and fixed on the camera body with attraction of a magnet used as an adapter, or masking plates of a small screen size may be used together with other holding means.

In the present invention, it will be apparent that a variety of different modes of operation can be formed on a basis of this invention without departing from the spirit and scope of the invention. This invention is not restricted to any specific embodiment but is limited to the appended claims.

What is claimed is:

1. A camera for selectively supporting one of a film having perforations along upper and lower edges and a film not having the perforations, comprising:
   masking plates for photographic screen size setting that are installed in a camera body to be freely movable between an inside position covering said perforations and an outside position exposing the regions occupied by said perforations;
   a perforation detecting means for determining whether perforations are present along the edges of at least the photographic screens of a film loaded in said camera body; and
   a masking plate driving means for receiving an output of said perforation detecting means, moving said masking plates to said inside screen size setting when a film is perforated, and moving said masking plate to said outside screen size setting when a film is imperforated.

2. A camera according to claim 1 wherein said masking plate driving means includes a gear engaging with gears formed on corner edges of masking plates and an electric drive source for driving the gear.

3. A camera for supporting a film having perforations in its upper and lower parallel edges and a film not having perforations, comprising:
   masking plates for photographic screen size setting that are installed in a camera body to be freely movable within at least a range of a larger screen size setting containing perforations along the parallel edges and a smaller screen size area setting excluding perforations;
   a perforation detecting means for determining whether perforations are present along at least one of the parallel edges of the photographic screens of a film loaded in said camera body; and
   a masking plate driving means receiving an output of said perforation detecting means, for moving said masking plates to said smaller screen size setting when a film is perforated, and moving said masking plates to said larger screen size setting when a film is imperforated.

4. A camera having a camera body for selectively supporting one of a film having perforations along its upper and lower edges and a film not having the perforations, comprising:
   a screen size setting means for selecting one of a smaller area lying within said perforations and a larger area including the perforations as a photographic screen;
   a perforation detecting means for determining whether perforations are present on at least one of the edges of at least the photographic screens of a film loaded in said camera body; and
   a switching means for receiving an output of said perforation detecting means, for setting said screen size setting means to said smaller area when a film is perforated, and setting said screen size setting means to said larger area when a film is imperforated.

5. A camera according to claim 4 wherein said screen size setting means comprises a pair of movable, L-shaped members for selectively masking one of said smaller or larger areas.

6. A camera according to claim 4 wherein said screen size setting means is formed with a liquid crystal plane board for selectively masking one of said smaller or larger areas.

7. A camera having a camera body for supporting a film having perforations along its upper and lower edges and a film not having the perforations, comprising:
   masking plates for photographic screen size setting that are installed in said camera body to be freely movable between a first position masking an area inside of said perforations and a second position masking an area including said perforations;
   a finder having an indicating means for indicating a field of view in association with a screen produced by said masking plates for photographic screen size setting;
   a perforation detecting means for determining whether perforations are present on at least one of the edges of at least the portion of the film containing photographic screens, which film is loaded in said camera body; and
   a masking plate driving means receiving an output of said perforation detecting means for moving said masking plates to said first position when the film is perforated, and for moving said masking plates to said second position when said film is imperforated.

8. A camera having a camera body for selectively supporting one of a film having perforations along its upper and lower edges and a film not having the perforations, comprising:
   masking plates for photographic screen size setting that are installed in a camera body to be freely movable between a first position excluding perforations and a second position including perforations;
   a perforation detecting means for determining whether perforations are present along at least one of the edges of at least a film portion containing photographic screens, which film is loaded in said camera body;
   a masking plate driving means receiving an output of said perforation detecting means, for moving said masking plates to said first position when a film is perforated, and moving said masking plates to said second position when a film is imperforated;
   means for feeding a film loaded in said camera body;
   means for detecting completion of feeding said film by one of a larger and a smaller given feed amount; and
   means for selecting the feed amount to be detected according to an output of said perforation detecting means.

9. A camera according to claim 8 wherein said means for detecting completion of feeding a film by a given feed includes a rotary member engaging a film surface and rotating with film feeding, a signal generation member for outputting a first pulse signal according to a quantity of rotation of said rotary member, and a counting means for counting outputs of said signal generation member.

10. A camera according to claim 9 wherein said means for detecting completion of feeding said film by a given feed amount includes a means for outputting a pulse signal responsive to passage of each perforation.

11. A camera having a camera body for supporting a film having perforations along its upper and lower edges and a film not having the perforations, comprising:
    a perforation detecting means for determining whether perforations are present along at least one of the edges of the photographic screens of a film loaded in said camera body;
    a first pulse counting means for counting pulses generated responsive to the passage of perforations at a reading location;
    a second pulse counting means for counting pulses generated from a rotary member that rotates responsive to a movement of a film in the camera body; and
    a means responsive to said detecting means for selectively controlling a film feed amount according to an output of said first pulse counting means when a film is perforated, or to an output of said second pulse counting means when a film is imperforated.

12. A camera having a camera body for supporting a film having perforations along its upper and lower edges and a film not having the perforations, comprising:
    masking means for selecting a photographic screen size;
    a perforation detecting means for determining whether perforations are present on at least one of the edges of at least a portion of the film containing photographic screens, which film is loaded in said camera body; and
    a means responsive to said perforation detecting means for operating said masking means so that when a film is perforated, a screen size area lying inside the perforations will be obtained as a photographic screen area, and when a film is imperforated, a screen size area including the perforations will be obtained.

13. A camera according to claim 12 wherein said masking means comprises a movable mask and said changing means includes means for moving said mask.

14. A camera according to claim 12 wherein said masking means comprises an electrooptical mask means and said changing means includes means for controlling the size of the transparent region of said mask means.

15. A camera according to claim 12 wherein said changing means attaches or detaches a changing mask.

16. A camera for supporting a film having perforations along its upper and lower edges and a film not having the perforations, comprising:
    a means for detecting presence or absence of perforations; and
    a means for providing a photographic screen size for said camera according to an output of said detecting means.

17. A camera according to claim 8 wherein said means for detecting completion of feeding said film by a given feed amount includes a means for outputting a pulse signal responsive to passage of each perforation.

18. A camera according to claim 3 wherein said masking plates comprise:
    a pair of substantially L-shaped plates collectively forming a screen mask of variable size and being slidably mounted to move in a first inward direction to form a smaller screen size and a second outer direction to form a larger screen size;
    motor drive means having an output gear;

a diagonal edge on each mask plate having a rack-like gear; and second and third gears driven by said first gear for respectively engaging one of the rack-like gears of an associated one of said mask plates for selectively driving said mask plates in either said inward or outward direction responsive to the direction of rotation of said motor drive gear.

19. A camera for selectively receiving one of a cartridge having a film with perforations and imperforated film comprising:

a camera body having a first cavity for receiving said cartridge and a second cavity for winding film contained in said cartridge;

a cover selectively sealing and unsealing said first and second cavities;

a rotatable drum mounted within said second cavity and provided with a rubber belt about the periphery thereof and having a substantially cylindrical periphery for engaging and winding up film with or without perforations without damage to the film being wound;

means for rotating said drum in a film take-up direction;

an arm having a first end pivotally mounted to said cover at a location adjacent said second cavity and having a first idler roller rotatably mounted at a second end for selectively engaging said take-up drum;

bias means engaging said arm for normally urging said first idler roller into engagement with said drum when said cover is closed to provide a first film driving nip, said first idler roller being displaced from said drum when said cover is open;

a second arm having a first end pivotally mounted to said camera body adjacent said second cavity and having a second idler roller rotatably mounted at a second end;

bias means engaging said second arm for normally urging said second roller into rolling engagement with said drum to provide a second film driving nip;

said second cavity having a curved concave surface whereby a film passing through said first nip is guided about said curved surface and toward said second nip as said drum is rotated in the take-up direction;

said film being substantially tightly wrapped about said drum upon continued rotation of said drum.

20. The camera according to claim 19 further comprising:

a rotatably mounted film feed detecting roller positioned between said first and second cavities and having a cylindrical surface for engagement with a film passing from said first cavity to said second cavity without damaging said film;

a third arm having a first end pivotally mounted to said cover and a second end provided with a third idler roller;

bias means engaging said third arm for normally urging said third idler roller into engagement with said film feed detecting roller when said back cover is closed to provide a third nip for directly feeding film in a linear path from said third nip to said first nip, said third idler roller being displaced from said film feed detecting roller when said back cover is open;

means for generating pulses responsive to rotation of said film feed detecting roller as said film feed detecting roller rotates due to the advancement of film through said third nip; and means for counting said pulses to determine the feed amount of the film.

21. A camera according to claim 20 wherein said pulse generating means comprises:

a rotatable member having a surface provided with an alternating pattern of conductive and insulating areas;

sensing means cooperating with said surface for generating pulses during rotation of said rotating member.

22. A camera according to claim 21 wherein the alternating conductive and insulating areas are chosen to generate a predetermined number of pulses per revolution of said rotating member.

23. A camera for selectively receiving one of a cartridge having a film with perforations and imperforated film comprising:

a camera body having a first cavity for receiving said cartridge and a second cavity for winding film contained in said cartridge;

a cover selectively sealing and unsealing said first and second cavities;

a rotatable drum mounted within said second cavity and provided with a rubber belt about the periphery thereof;

means for rotating said drum in a film take-up direction;

an arm having a first end pivotally mounted to said cover at a location adjacent said second cavity and having a first idler roller rotatably mounted at a second end for selectively engaging said take-up drum;

bias means engaging said arm for normally urging said first idler roller into engagement with said drum when said cover is closed to provide a first film driving nip, said first idler roller being displaced from said drum when said cover is open;

a second arm having a first end pivotally mounted to said camera body adjacent said second cavity and having a second idler roller rotatably mounted at a second end;

bias means engaging said second arm for normally urging said second roller into rolling engagement with said drum to provide a second film driving nip;

said second cavity having a curved concave surface whereby a film passing through said first nip is guided about said curved surface and toward said second nip as said drum is rotated in the take-up direction;

said film being substantially tightly wrapped about said drum upon continued rotation of said drum;

a rotatably mounted film feed detecting roller positioned between said first and second cavities and having a cylindrical surface for engagement with a film passing from said first cavity to said second cavity;

a third arm having a first end pivotally mounted to said cover and a second end provided with a third idler roller;

bias means engaging said third arm for normally urging said third idler roller into engagement with said film feed detecting roller when said back cover is closed to provide a third nip, said third idler roller being displaced from said film feed detecting roller when said back cover is open;

means for generating pulses responsive to rotation of said film feed detecting roller as said film feed detecting roller rotates due to the advancement of film through said third nip;

means for counting said pulses to determine the feed amount of the film;

stationary detecting means for generating pulses responsive to the passage of perforations in a film;

means for counting said pulses to determine a film feed amount;

means for detecting whether a film in said camera is perforated or not; and means responsive to said detecting means for selecting said film feed pulse generating means when the film is imperforated and for selecting the stationary detecting means when said film is perforated.

24. A method for operating a camera including means for selectively receiving one of a film cartridge containing imperforated film and a cartridge containing perforated film and mask means, and means switchable between a large and a small mask size, said method comprising the steps of:

detecting the presence or absence of perforations in the film loaded into said camera; and switching the screen size in the camera by movement of said mask means to one of said sizes according to whether the film is perforated or imperforated.

25. The method of claim 24 wherein said camera further includes:

means for counting perforations in a perforated film for determining a film feed amount; and means for generating pulses responsive to movement of the film in a take-up direction, said method further comprising the steps of:

selecting one of said film feed means according to whether the film is perforated or imperforated;

performing a photographing operation responsive to operation of a release switch;

advancing the film;

counting the film feed pulses of the operative film feed amount determining means; and halting the advance of the film when a predetermined count has been reached.

26. A method for operating a camera for selectively receiving one of a film cartridge having perforations along opposite edges thereof and a film cartridge having imperforated film except for a leader portion of predetermined length and masking means for setting a large or a small screen size, comprising the steps of:

employing a rotating take-up drum to initially advance and wind up the film feeder;

examining the film for perforations after at least a predetermined portion of the leader has been wound about the drum;

determining if the film has perforations beyond the leader portion; and switching the screen size in the camera by movement of said mask means to one of said sizes according to whether the film is perforated or imperforated.

* * * * *

UNITED STATES PATENT AND TRADEMARK OFFICE
CERTIFICATE OF CORRECTION

PATENT NO. : 5,298,929
DATED : March 29, 1994
INVENTOR(S) : Katsuhiko Tsunefuji, et. al.

It is certified that error appears in the above-indentified patent and that said Letters Patent is hereby corrected as shown below:

Column 3, line 47, change "Fig. 23 is a front view" to --Fig. 23a is a plan view--.

Column 4, Table 1, line 11, change first number under heading Maxium "48.0" to --44.4--.

Signed and Sealed this

Twenty-second Day of November, 1994

Attest:

BRUCE LEHMAN

*Attesting Officer*     *Commissioner of Patents and Trademarks*